United States Patent
Bennett, Jr.

[11] Patent Number: 5,628,459
[45] Date of Patent: May 13, 1997

[54] FIRE BREAK DEVICE

[76] Inventor: Oliver Bennett, Jr., 161 Prarie View Ct., Westwego, La. 70094

[21] Appl. No.: 391,928

[22] Filed: Feb. 21, 1995

[51] Int. Cl.$^6$ ................................................. B05B 15/06
[52] U.S. Cl. ........................ 239/280.5; 239/273; 169/52
[58] Field of Search ........................ 239/273, 276, 239/275, 279, 280.5, 281; 169/25, 51, 52

[56] References Cited

U.S. PATENT DOCUMENTS

| | | | |
|---|---|---|---|
| 255,430 | 3/1882 | Holland, Jr. | 169/25 X |
| 2,865,674 | 12/1958 | Jelmeland | 299/104 |
| 3,241,772 | 3/1966 | Thompson | 239/275 |
| 3,576,212 | 4/1971 | Siler | 169/2 |
| 3,633,826 | 1/1972 | Baker | 239/276 X |
| 3,939,503 | 2/1976 | Nazworth | 239/281 X |
| 4,615,487 | 10/1986 | O'Brien et al. | 239/281 |
| 4,674,686 | 6/1987 | Trapp | 239/280.5 X |
| 5,249,632 | 10/1993 | Sparling et al. | 169/52 |
| 5,425,505 | 6/1995 | Jones | 169/52 X |

*Primary Examiner*—Robert J. Oberleitner
*Assistant Examiner*—Pamela Lipka
*Attorney, Agent, or Firm*—Joseph N. Breaux

[57] ABSTRACT

A fire shielding device which is portable and may be positioned adjacent to structures for creating a fluid shield in areas which may be exposed to fire from an adjacent forest, field, building or other source.

7 Claims, 3 Drawing Sheets

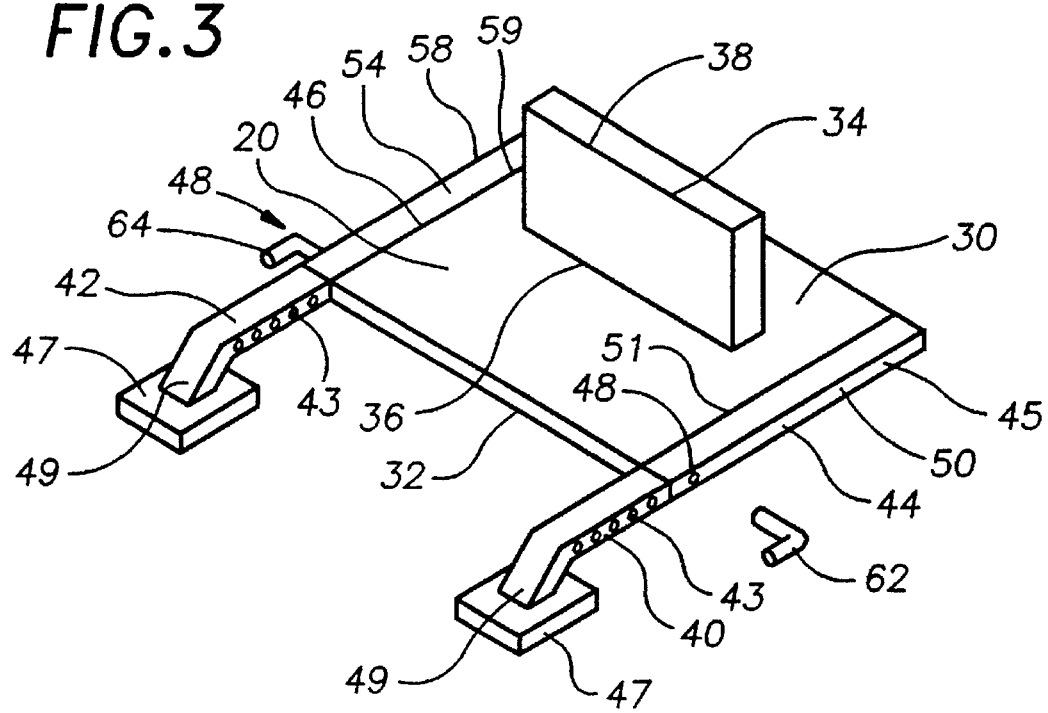
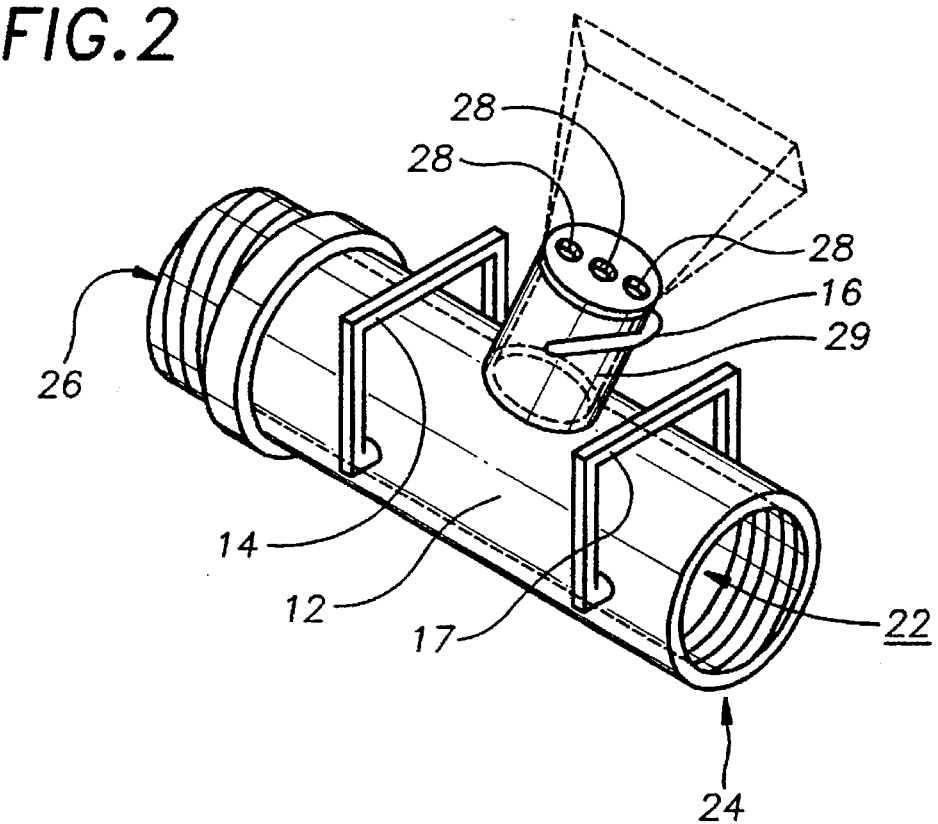

_5,628,459_

FIRE BREAK DEVICE

DESCRIPTION

1. Technical Field

The present invention relates to devices for fire protection and more particularly to devices for fire protection that are portable and positionable so as to provide a water shield between a structure and an approaching fire.

2. Background Art

In many areas of the U.S. and other countries, homes and buildings are built in close proximity to forests, large groups of trees, and other flammable materials. When such forests or trees are on fire, the flames reach terrifying proportions and are practically impossible to extinguish or control, except by large groups of experienced fire fighters, using professional fire fighting equipment. Homes close to such forests are constantly threatened by such fires, especially in dry periods. In the past, it has been difficult for home owners to protect their homes when these fires threaten.

It would be desirable, therefore, for a home owner to have a device which allowed him/her to be able to protect his/her home, or other structure, by providing a water shield between the home or structure and an approaching fire. It would further be desirable, if the device was portable and could be rapidly set-up and utilized when and where needed. It would further be desirable, if the device could be used in connection with readily available residential water sources; the device did not require constant monitoring; and could be connected in a series and supplied from a single pressurized water source.

GENERAL SUMMARY DISCUSSION OF INVENTION

It is thus an object off the invention to provide a fire break device that is connectable to a source off pressurized water to create a water shield.

It is a further object of the invention to provide a fire break device that includes a mechanism for directing and maintaining a water shield in a desired position without requiring constant supervision.

It is a still further object of the invention to provide a fire break device that may be connected in a series.

Accordingly, a fire break device connectable to a source of pressurized water and suitable for use adjacent the exterior of structures is provided. The fire break device comprises: a rigid conduit member, a first blocking valve, and a base member.

The rigid conduit member has a fluid passageway therein in connection between a first and second end opening, and at least one discharge orifice in fluid communication with the fluid passageway. The first end opening includes a mechanism for connection with a source of pressurized fluid.

The first blocking valve is installed within the fluid passageway in a manner to block the passage of fluid through the second end opening when the first blocking valve is in a closed position and to allow the passage of fluid through the second end opening when the blocking valve is in an open position.

The base member is in connection with the rigid conduit member in a manner such that the discharge orifice is directed away from the base member.

In use, a source of pressurized water, such as a garden hose, is connected to the first end opening; the first blocking valve is placed in the closed position; the base member is placed on a surface in a manner to direct the discharge orifice in the direction of the structure; and the valve controlling the supply of water to the garden hose is turned on creating a spray of water from the discharge orifice between the structure and an approaching fire.

In a preferred embodiment of the fire break device, the base member preferably includes a planar member having a first and second surface. The first surface is in functionally rigid connection with the rigid conduit member. The second surface is substantially planar and adapted for contact with a substantially flat surface. The second surface preferably has a surface area greater than the length of the conduit member multiplied by the circumference or cross-sectional perimeter of the fluid passageway. In addition, the base member may include a connecting member having a first and second end, the first end being connected to the first surface, the second end being connected to the rigid conduit member at a location and in a manner such that the discharge orifice is oriented away from the planar member.

The base member may include a stake extending from the second surface to anchor the base member in place when in use. The base member may also include, in place of the stake, a first and second leg member in connection with the planar member and extending outwardly from the planar member in a manner such that the first and second leg members are oriented substantially in parallel with one another. The length of the leg members is preferably between four and twenty-four inches.

The first leg member may include a first foot connected to a first terminal end of the first leg member and the second leg member may include a second foot connected to a second terminal end of the second leg. The first foot may have one or more first cleat members extending therefrom. The second foot may have one or more second cleat members extending therefrom.

In another preferred embodiment of the fire break device, the base member may further includes a first and second leg member retraction mechanism. The first retraction mechanism is connected to the planar member in a manner such that the extent to which the first leg member extends from the planar member may be varied. The second retraction mechanism is connected to the planar member in a manner such that the extent to which the second leg member extends from the planar member may be varied.

The first retraction mechanism may include a first leg receiving member in connection with the planar member and having a first retraction pathway therein for slidably receiving a first section of the first leg member. In a similar manner, the second retraction mechanism may include a second leg receiving member in connection with the planar member and having a second retraction pathway therein for slidably receiving a second section of the second leg member.

The first retraction mechanism preferably includes a first locking mechanism having a first pin member insertable through a first wall of the first leg receiving member and into the first section of the first leg member. The second retraction mechanism preferably includes a second locking mechanism having a second pin member insertable through a second wall of the second leg receiving member and into the second section of the second leg member.

The first wall of the first leg receiving member may have a first wall aperture therethrough; and the first section of the first leg member may have a plurality of first section apertures thereinto which are individually alignable with the first wall aperture. The second wall of the second leg receiving member may have a second wall aperture therethrough; and the second section of the second leg member may have a plurality of second section apertures thereinto which are individually alignable with the second wall apertures. Of course, the wall of the leg receiving member may have the multiple apertures and the section of the leg member insertable within the Leg receiving member may have a single aperture.

In another preferred embodiment of the fire break device, a diffuser is connected to the rigid conduit member and positioned in relationship with the discharge orifice in a manner such that the diffuser contacts and diffuses a portion of a fluid stream discharged from the discharge orifice.

In another preferred embodiment, the fire break device further includes a second blocking valve in connection within the rigid conduit member in a manner such that fluid communication between the fluid passageway and the discharge orifice is blocked when the second blocking valve is in a closed position. The second blocking valve is preferably a ball-type valve.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is an isometric view of the conduit member of the embodiment shown in FIG. 1 in isolation.

FIG. 3 is an isometric view of the base member of the embodiment shown in FIG. 1 in isolation.

EXEMPLARY MODE FOR CARRYING OUT THE INVENTION

Figure 1:
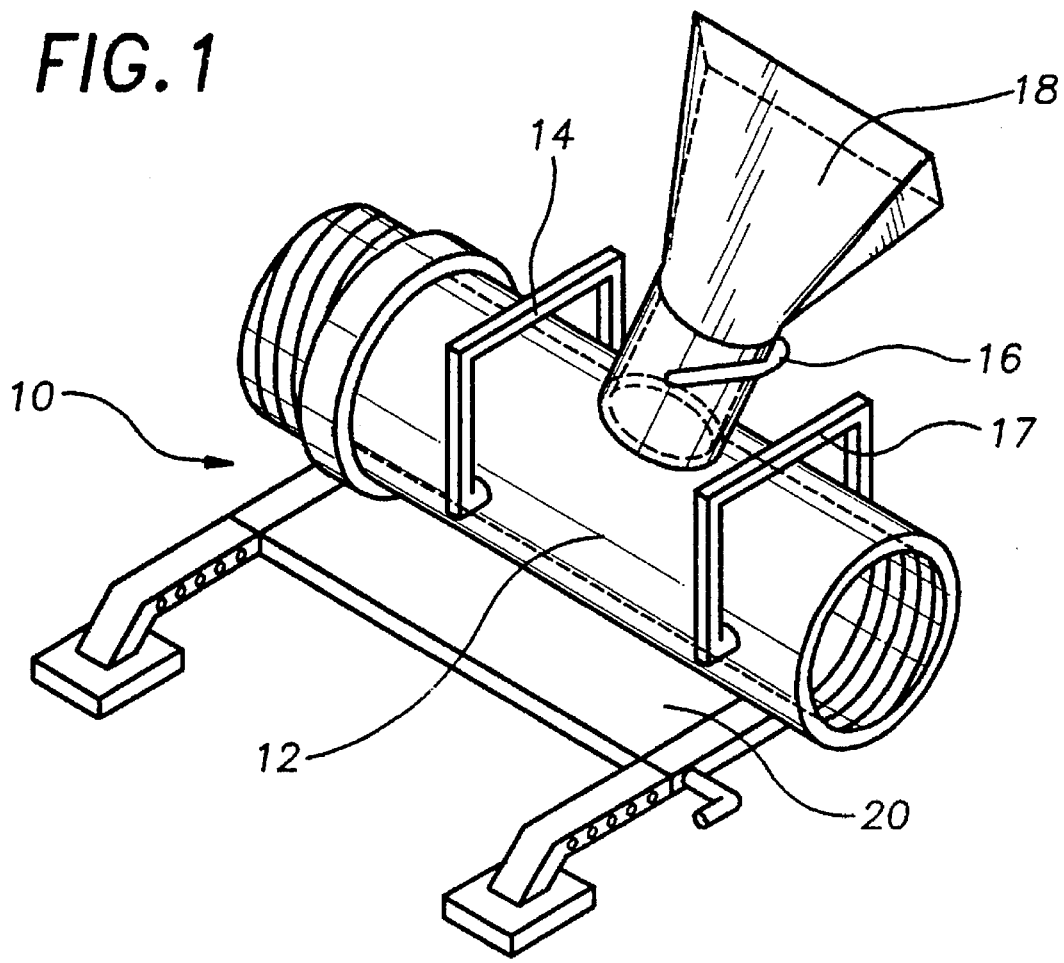
FIG. 1 is a isometric view of an exemplary embodiment of the fire break device of the present invention.

FIG. 1 shows an exemplary embodiment of the fire break device of the present invention generally designated by the numeral 10. In this embodiment, fire break device 10 is connectable to a common garden hose as a source of pressurized water. Fire break device 10 includes a rigid conduit member 12, a first blocking valve 14, a second blocking valve 16, a third blocking valve 17, a diffuser 18, and a base member 20.

FIG. 2 shows rigid conduit member 12 in isolation. Rigid conduit member 12 is an eight inch length of metal tubing having a fluid passageway 22 in connection between a first and second end opening 24,26, and three, ⅛ inch diameter, discharge orifices 28. Discharge orifices 28 are in fluid communication with the fluid passageway 22. First end opening 24 is internally threaded for attachment to the externally threaded end coupling of a standard garden hose. First blocking valve 14 is a ball-type valve installed within fluid passageway 22 between second end opening 26 and the three discharge orifices 28. Second blocking valve 16 is a ball-type valve installed within an extension section 29 of fluid passageway 22 between first end opening 24 and the three discharge orifices 28. Third blocking valve 17 is installed within fluid passageway 22 adjacent first opening 24.

FIG. 3 shows base member 20 in isolation. Base member 20 is a six inch by six inch section of ⅛ inch thick steel sheeting having substantially flat side surfaces 30,32. Side surface 30 has a connecting member 34 extending substantially perpendicularly therefrom. Connecting member 34 is a six inch by two inch rectangular section of ⅛ inch thick steel sheeting which has been welded to side surface 30 along one its longer sides 36. The other longer side 38 is welded to rigid conduit member 12 in a manner such that the discharge orifices 28 are directed away from the plane defined by side surface 30 at about a sixty degree angle.

Base member 20 also includes first and second leg members 40,42 which are, respectively, in adjustable connection with first and second leg member retraction mechanisms 44,46. First and second leg members 40,42 are eight inch lengths of square steel tubing having outer cross-sectional dimensions of ½ inch by ½ inch. Each leg member 40,42 has six pairs of 3/16 inch diameter, apertures 43 spaced along one end at about a ¾ inch interval. Each leg member 40,42 has a foot member 49 having a 1-½ inch cleat 47 extending outwardly therefrom.

First retraction mechanism 44 includes a six inch length of square, 9/16 inch by 9/16 inch cross-section, steel tubing 45 having a pair of 3/16 inch apertures 48 through opposed sidewalls 50,51. Second retraction mechanism 46 includes a six inch length of square, 9/16 inch by 9/16 inch cross-section, steel tubing 54 having a pair of 3/16 inch apertures 48 through two opposes sidewalls 58,59. Each retraction mechanism 44,52 also includes a locking pin 62,64. Each locking pin 62,64 has an external diameter of 5/32 inches and is insertable through apertures 43 and apertures 48, when aligned, to secure the first and second leg members 40,42 into a desired position.

Figure 4:
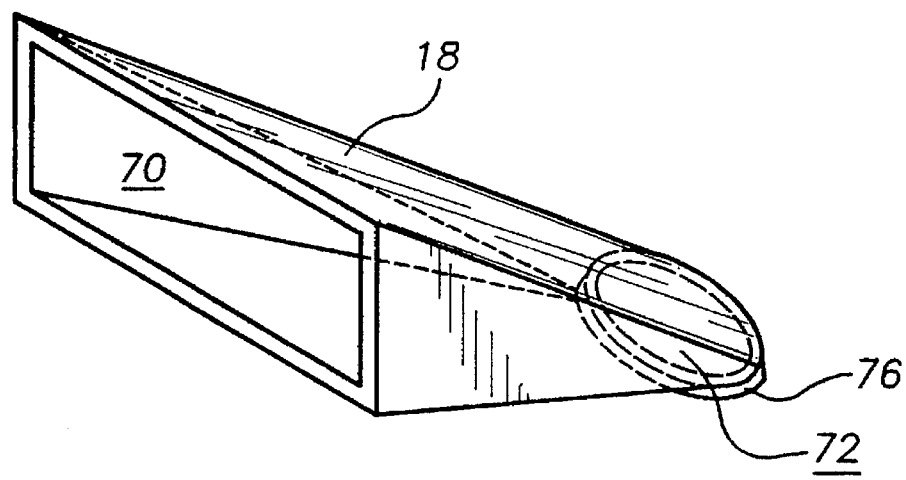
FIG. 4 is an isometric view off the diffuser of the embodiment shown in FIG. 1 in isolation.

FIG. 4 shows diffuser 18 in isolation. Diffuser 18 is a hollow, frustrum shaped, steel device having a first, seven inch by three inch, substantially rectangular shaped, opening 70 and a second opening 72 having a smaller area than first opening 70 and a substantially circular perimeter 76 which conforms to the outer contour of extension section 29 of conduit member 12 (FIG. 3) and surrounds orifices 28. Second opening 72 is positioned over orifices 28 and the perimeter 76 of diffuser 18 welded into connection with extension section 29.

Figure 5:
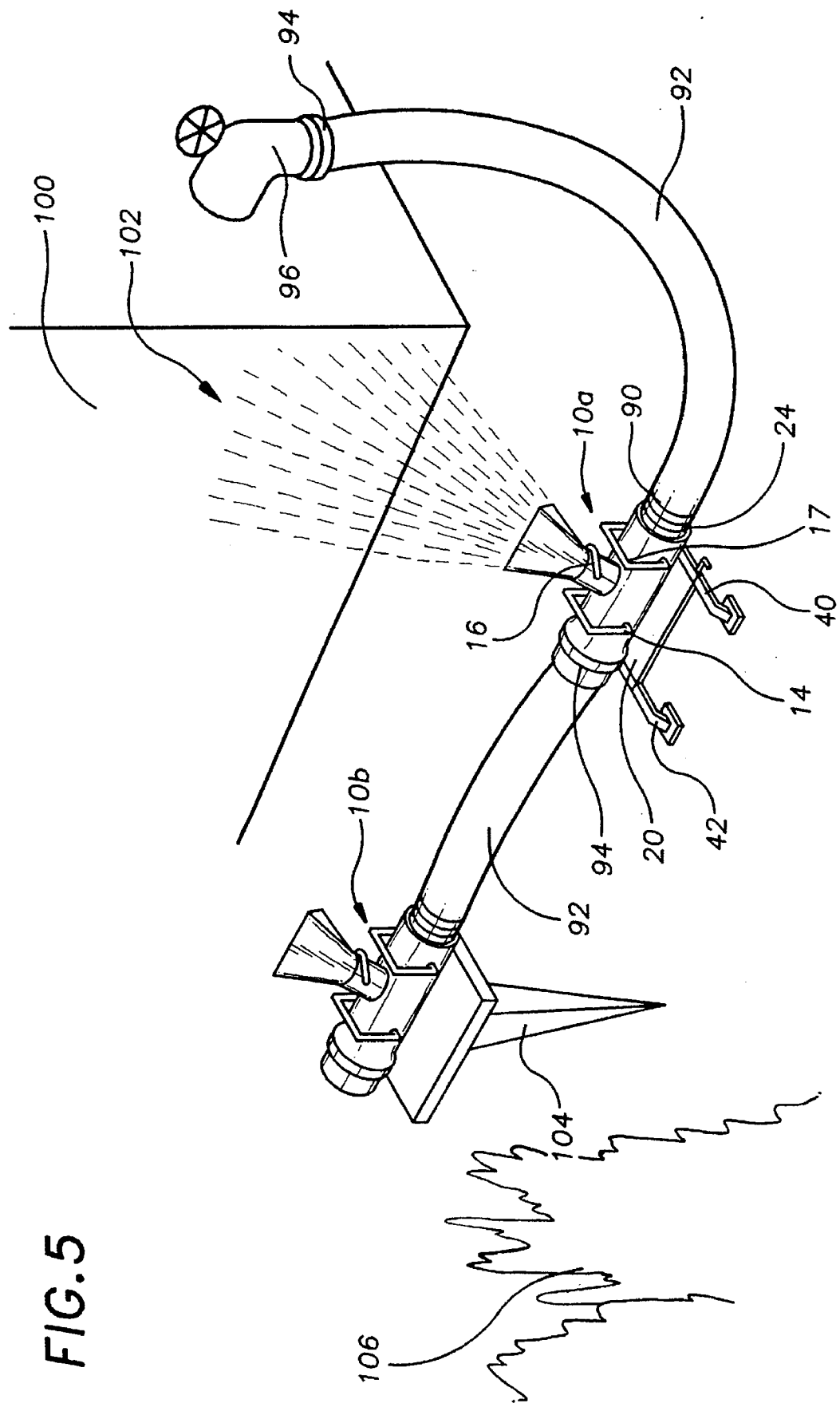
FIG. 5 is a view of two of the fire break devices in use in a representative fire situation.

FIG. 5 shows two fire brake devices 10a,10b in a series connection adjacent a representative structure 100. Use of the fire break device 10 in a single and double application is now described with reference to FIGS. 1–5. In the single use application, the threaded male end 90 of a standard garden hose 92 is threaded into first end opening 24 and the threaded female end of garden hose 94 attached to a standard residential faucet assembly 96; first blocking valve 14 is placed in the closed position; second blocking valve 16 is placed in the open position; third blocking valve 17 is placed in the open position; base member 20 is placed on a surface in a manner to direct discharge orifices 28 in the direction of the structure 100; the position of first and second leg members 40,42 are adjusted using first and second retraction mechanisms 44,46; the valve of faucet assembly 96 is turned on creating a spray of water 102 from the discharge orifice between the structure and an approaching-fire 106.

In the double use, additional fire break devices 10b may be added in a series by threading the female end 94 of a second length of garden hose 92 to the externally threaded exterior of second end opening; and attaching the second or additional fire brake devices 10b in the manner previously described. Fire break device 10b includes a stake type anchor 104 which is inserted into the ground prior to use.

It is noted that the embodiment of the fire break device described herein in detail for exemplary purposes is of course subject to many different variations in structure, design, application and methodology. Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed is:

1. A fire break device connectable to a source of pressurized water and suitable for use adjacent the exterior of structures, said fire break device comprising:
    a) a rigid conduit member having a fluid passageway therein in connection between a first and second end opening, and at least one discharge orifice in fluid communication with said fluid passageway, said first end opening including means for connection with a source of pressurized fluid;
    b) a first blocking valve installed within said fluid passageway in a manner to block the passage of fluid through said second end opening when said first blocking valve is in a closed position and to allow the passage of fluid through said second end opening when said blocking valve is in an open position;
    c) a base member including a planar member and a connecting member, said planar member having a first and second surface, said second surface being substantially planar and adapted for contact with a substantially flat surface, said connecting member being substantially rectangular shaped and having a first and second end, said first end being connected to said first surface, said second end being connected to said rigid conduit member at a location and in a manner such that said discharge orifice is oriented away; and
    d) a diffuser connected to said rigid conduit member and positioned in relationship with said discharge orifice in a manner such that said diffuser contacts and diffuses a portion of a fluid stream discharged from said discharge orifice, said diffuser being hollow and frustrum shaped and including a first substantially rectangular shaped opening and a second opening having a smaller area than said first opening and a substantially circular perimeter, said second opening being positioned over and surrounding said discharge orifice.

2. The fire break device of claim 1, wherein said base member further includes:
    a first and second leg member in connection with said planar member and extending outwardly from said planar member in a manner such that said first and second leg members are oriented substantially in parallel with one another.

3. The fire break device of claim 2 wherein said base member further includes:
    a first retraction mechanism connected to said planar member in a manner such that the extent to which said first leg member extends from said planar member may be varied; and
    a second retraction mechanism connected to said planar member in a manner such that the extent to which said second leg member extends from said planar member may be varied.

4. The fire break device of claim 3, wherein:
    said first retraction mechanism includes a first leg receiving member in connection with said planar member and having a first retraction pathway therein for slidably receiving a first section of said first leg member; and
    said second retraction mechanism includes a second leg receiving member in connection with said planar member and having a second retraction pathway therein for slidably receiving a second section of said second leg member.

5. The fire break device of claim 4, wherein:
    said first retraction mechanism further includes a first locking mechanism having a first pin member insertable through a first wall of said first leg receiving member and into said first section of said first leg member; and
    said second retraction mechanism further includes a second locking mechanism having a second pin member insertable through a second wall of said second leg receiving member and into said second section of said second leg member.

6. The fire break device of claim 5, wherein:
    said first wall of said first leg receiving member has a first wall aperture therethrough;
    said first section of said first leg member has a plurality of first section apertures thereinto which are individually alignable with said first wall aperture;
    said second wall of said second leg receiving member has a second wall aperture therethrough; and
    said second section of said second leg member has a plurality of second section apertures thereinto which are individually alignable with said second wall apertures.

7. The fire break device of claim 6, further including:
    a second blocking valve in connection within said rigid conduit member in a manner such that fluid communication between said fluid passageway and said discharge orifice is blocked when said second blocking valve is in a closed position.

* * * * *